(12) United States Patent
Sharma et al.

(10) Patent No.: US 12,028,259 B2
(45) Date of Patent: Jul. 2, 2024

(54) INFRASTRUCTURE EQUIPMENT, WIRELESS COMMUNICATIONS NETWORKS AND METHODS

(71) Applicant: Sony Group Corporation, Tokyo (JP)

(72) Inventors: Vivek Sharma, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 458 days.

(21) Appl. No.: 17/421,727

(22) PCT Filed: Jan. 9, 2020

(86) PCT No.: PCT/EP2020/050456
§ 371 (c)(1),
(2) Date: Jul. 9, 2021

(87) PCT Pub. No.: WO2020/148159
PCT Pub. Date: Jul. 23, 2020

(65) Prior Publication Data
US 2022/0086095 A1 Mar. 17, 2022

(30) Foreign Application Priority Data
Jan. 15, 2019 (EP) ..................................... 19151959

(51) Int. Cl.
*H04L 47/24* (2022.01)
*H04W 28/02* (2009.01)
*H04W 76/12* (2018.01)

(52) U.S. Cl.
CPC ............. *H04L 47/24* (2013.01); *H04W 76/12* (2018.02)

(58) Field of Classification Search
CPC .... H04L 47/24; H04W 76/12; H04W 28/0268
See application file for complete search history.

(56) References Cited

U.S. PATENT DOCUMENTS

| | | | |
|---|---|---|---|
| 11,115,105 B2* | 9/2021 | Agiwal | ............... H04W 12/033 |
| 11,659,432 B2* | 5/2023 | Agiwal | ................. H04W 76/12 370/235 |

(Continued)

FOREIGN PATENT DOCUMENTS

| | | |
|---|---|---|
| CN | 105813214 A | 7/2016 |
| CN | 108605282 A | 9/2018 |

(Continued)

OTHER PUBLICATIONS

U.S. Department of Commerce, "Proposal for NR DRB priority and preemption", 3GPP TSG-RAN WG2 #96, R2-168893, Nov. 14-18, 2016, Reno, USA.

(Continued)

*Primary Examiner* — Harry H Kim
(74) *Attorney, Agent, or Firm* — XSENSUS LLP

(57) ABSTRACT

A method of operating an infrastructure equipment forming part of a wireless communications network comprises establishing a radio bearer in accordance with a radio resource connection procedure for transmitting data via a wireless access interface to the wireless communications network, the radio bearer including one or more quality of service flows. Each of the quality of service flows is associated with a communications service provided to the communications device and each of the quality of service flows is defined by parameters for communicating the data for the communications service. The parameters include a relative priority indicator providing an indication of a relative priority level for transmitting from the communications device the data with respect to other quality of service flows.

12 Claims, 6 Drawing Sheets

(56) References Cited

U.S. PATENT DOCUMENTS

| | | | |
|---|---|---|---|
| 2002/0114305 A1 | 8/2002 | Oyama | |
| 2016/0105820 A1 | 4/2016 | Hämäläinen | |
| 2017/0374672 A1* | 12/2017 | Selvaganapathy | .... H04W 76/15 |
| 2018/0041936 A1 | 2/2018 | Kim et al. | |
| 2020/0112873 A1* | 4/2020 | Zhu | ........................ H04W 76/23 |
| 2020/0213894 A1* | 7/2020 | Agiwal | ............. H04W 28/0263 |
| 2021/0099385 A1* | 4/2021 | Huang | ............... H04B 7/15528 |
| 2021/0127319 A1* | 4/2021 | Huang | .................... H04W 8/08 |
| 2021/0352521 A1* | 11/2021 | Pan | ........................ H04L 47/805 |
| 2023/0300664 A1* | 9/2023 | Agiwal | ............. H04W 28/0263 370/235 |

FOREIGN PATENT DOCUMENTS

| | | |
|---|---|---|
| KR | 20140051728 A | 5/2014 |
| WO | WO-2005084061 A1 | 9/2005 |
| WO | WO-2013053376 A1 | 4/2013 |
| WO | WO-2017141990 A1 | 8/2017 |
| WO | 2018/075828 A1 | 4/2018 |
| WO | 2018/145879 A1 | 8/2018 |
| WO | WO-2018176394 A1 | 10/2018 |
| WO | 2018/202205 A1 | 11/2018 |

OTHER PUBLICATIONS

International Search Report and Written Opinion dated Jun. 25, 2020, received for PCT Application PCT/EP2020/050456, Filed on Jan. 9, 2020, 15 pages.

Holma et al., "LTE for UMTS OFDMA and SC-FDMA Based Radio Access", John Wiley and Sons, 2009, pp. 25-27.

NTT Docomo Inc., "Revised WID on New Radio Access Technology", 3GPP TSG RAN Meeting #78, RP-172834, Dec. 18-21, 2017, 11 pages.

Huawei et al., "New SID on Physical Layer Enhancements for NR URLLC", 3GPP TSG-RAN#80, RP-181477, Jun. 11-14, 2018, 5 pages.

NTT Docomo Inc., "Summary of 7.2.6.3 Enhanced UL Grant-Free Transmissions", 3GPP TSG RAN WG1 Meeting #94, R1-1809979, Aug. 20-24, 2018, 20 pages.

3GPP, "5G System; Technical Realization of Service Based Architecture; Stage 3 (Release 16)", 3GPP TS 29.500 V16.4.0, Jun. 2020, pp. 1-78.

3GPP, "NG-RAN; NG Application Protocol (NGAP) (Release 15)", 3GPP TS 38.413 V15.1.0, Sep. 2018, pp. 1-295.

* cited by examiner

INFRASTRUCTURE EQUIPMENT, WIRELESS COMMUNICATIONS NETWORKS AND METHODS

CROSS-REFERENCE TO RELATED APPLICATIONS

The present application is based on PCT filing PCT/EP2020/050456, filed Jan. 9, 2020, which claims priority to EP 19151959.4, filed Jan. 15, 2019, the entire contents of each are incorporated herein by reference.

BACKGROUND

Field of Disclosure

The present disclosure relates to infrastructure equipment for forming part of a wireless communications network and methods for operating infrastructure equipment to communicate data to communications devices via a plurality of quality of service flows.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to support efficient connectivity for a wide range of devices associated with different applications and different characteristic data traffic profiles to support different services.

One example of a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

Supporting different service types can be more challenging, particularly because when accessing limited radio communications resources, where some contention between service may require one service to be prioritised over another.

SUMMARY OF THE DISCLOSURE

The present disclosure can help address or mitigate at least some of the issues discussed above. According to an example embodiment there is provided a method of operating an infrastructure equipment forming part of a wireless communications network, the method comprising establishing a packet data bearer for transmitting data to a communications device via a wireless access interface, establishing the packet data bearer including establishing a radio bearer in accordance with a radio resource connection procedure for transmitting the data via the wireless access interface to the communications device, the radio bearer including one or more quality of service flows. Each of the quality of service flows is associated with a communications service provided to the communications device and each of the quality of service flows is defined by parameters for communicating the data for the communications service. The parameters include a relative priority indicator providing an indication of a relative priority level for transmitting the data with respect to other quality of service flows. The method includes transmitting the data via the radio bearer for the one or more quality of service flows by prioritising the data for one of the one or more quality of service flows over at least one other of the quality of service flows according to the relative priority indicator for the quality of service flow. The relative priority indicator for each of the quality of service flows includes an indication of a priority level for the data, which includes a priority according to at least one other communications attribute.

The communications attribute may include one or more of a type of the communications service being provided to the communications device, an indication of one of a plurality of network operators or an indication one of a plurality of inter radio access technology or frequency selection priority. The communications attribute can be represented as an increase in a range of priority level indications provided by the relative priority indicator so that the data can be prioritised not only to provide a quality of service but also to prioritise one quality of service flow over another based on another communications attribute such as service type, operator or radio access technology.

Embodiments of the present technique can therefore provide for prioritising the transmission of the data for a quality of service flow/radio bearer in accordance with a more diverse range of options and circumstances than are conventionally available. For example the infrastructure equipment may be shared by different operators for which the relative priority indicator can be used to prioritise the transmission of data for one operator, which may own the infrastructure equipment over another operator.

As explained below, the increase in the number of priority levels (range) may be implemented in the network even if it is not shared between operators.

According to another aspect of the present technique there is provided a method of operating an infrastructure equipment forming part of a radio network of a wireless communications network. The method comprises operating a plurality of packet data bearers for communicating data to or from communications devices via a wireless access interface to provide wireless connectivity to the communications devices. Each of the plurality of packet data bearers includes one or more radio bearers, each of the radio bearers including one or more quality of service flows defined by parameters for communicating the data. The method comprises determining an operator priority level associated with each of the packet data bearers between a plurality of network operators, the communications devices each being a subscriber of one of the plurality of network operators for the wireless connectivity, and controlling the plurality of packet data bearers to prioritise communicating the data to or from the communications devices according to a relative priority according to the operator priority level. The infrastructure equipment may form part of a radio access network which is shared by a plurality of network operators. The operator priority level associated with each of the packet data bearers may indicate that a user of the communications device is a subscriber of one of the network operators so that the data is transmitted with a priority which is differentiated for the quality of service flow with respect to other quality of service flows based on the user's network operator.

Embodiments of the present technique, which further relate to infrastructure equipment, communications devices as well as methods of operating communications devices, and infrastructure equipment, methods and circuitry for communications devices and infrastructure equipment, can provide an improvement in the transmission of uplink data using grant free communications resources.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
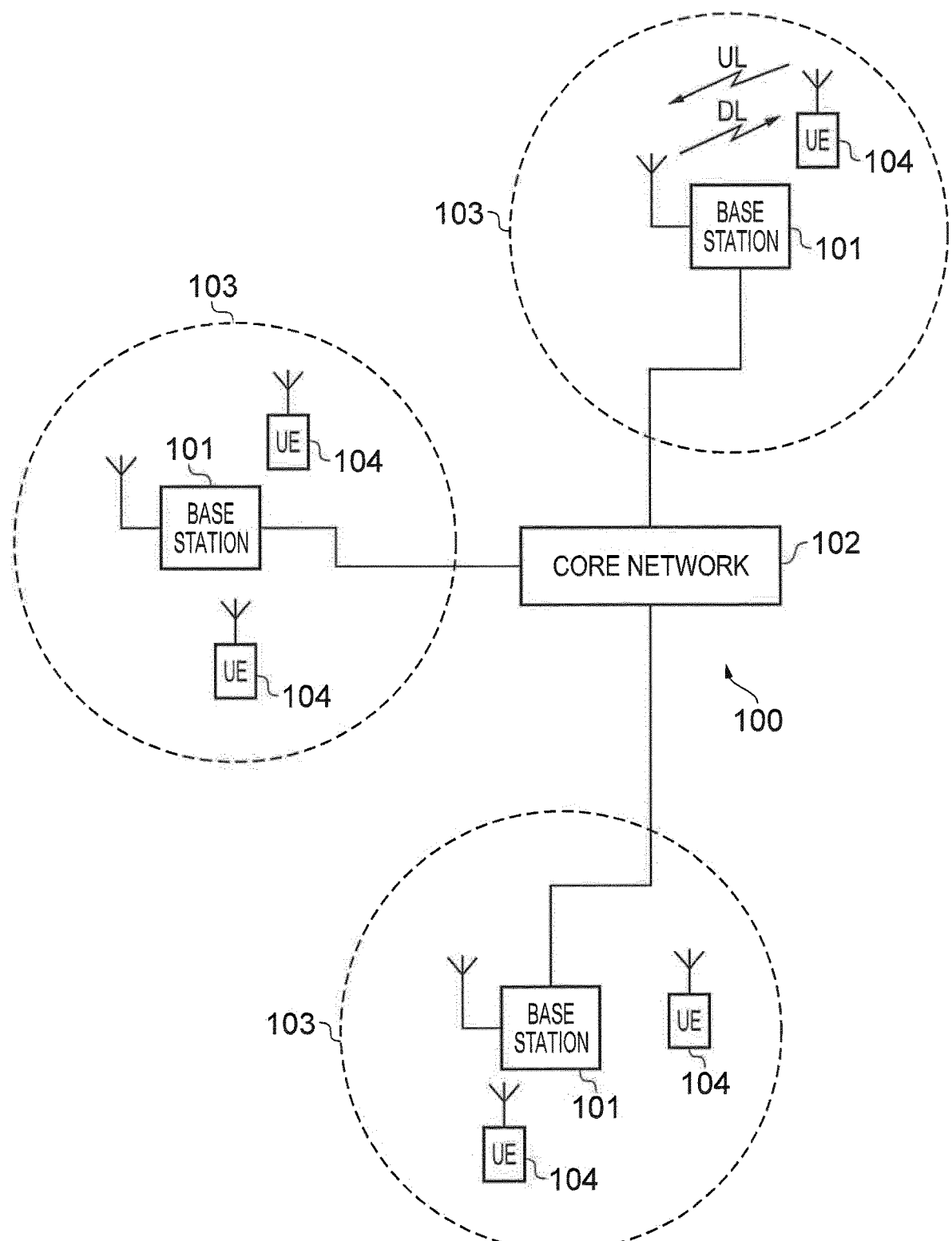
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
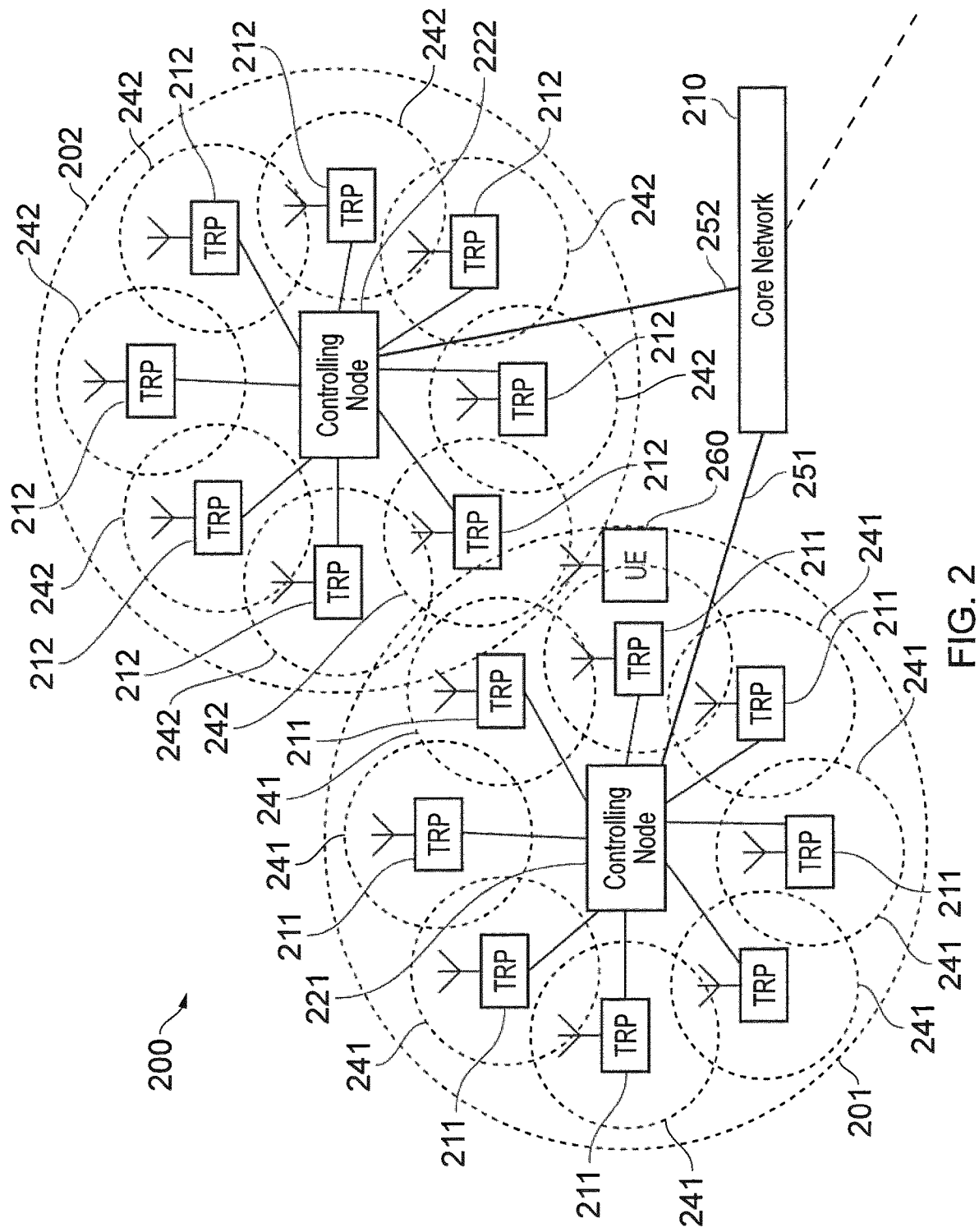
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 400 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Prioritising Data Transmission for Different QoS Flows

Embodiments of the present technique can provide an extended prioritisation of data transmission within a wireless communications network. Embodiments of the present technique are configured to include an extension of conventional indicators for prioritising a transmission of data for different quality of service flows to include a communication attribute such as an indicator of an operator of a mobile communications network, a service type or an access technology.

Currently core network architectures for 5G type standards include different communications parameters for communicating data with differing quality of service via different data flows or radio access bearers. For example a so called 5G Quality of service identifier (5QI) is a standardised set of quality of service (QoS) characteristics, which are defined in TS23.501 section 1.1.1, 5.7.4. These provide a sequence of values with respect to which a priority level, a packet delay budget, a packet error rate, a default maximum data burst volume, a default average window size are disclosed for different example services.

A second way of differentiating quality of service is the so called allocation and retention priority (ARP) which is provided for different bearers or QoS flows are scheduled or admitted or released during for example congestion. The ARP is communicated by the core network to an infrastructure equipment.

Although the above examples provide for different QoS flows, they do not provide an arrangement for prioritising data transmission based on communication attributes which can extend a prioritisation of the data transmission for new service types. Example embodiments described below can find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1-10^{-5}$ (99.999%) for one transmission of a 32 byte packet with a user plane latency of 1 ms [3]. Embodiments can find application particularly to URLLC, which has recently been proposed within 3GPP for 4G and 5G communications networks. In some examples, URLLC communications are either low latency (where the user plane latency target is 1 ms) or high reliability (where the acceptable error rate on URLLC transmissions is $10^{-5}$) or both low latency and high reliability (where both the latency and reliability targets need to be met at the same time). Embodiments of the present technique have been devised in order to provide an improved way of delivering services for 5G for example URLLC or eMBB. However in order to deliver these services an enhancements of a relative priority indication is provided in accordance with embodiments of the present technique to prioritise such services. Examples will be explained in the following paragraphs.

Figure 3:
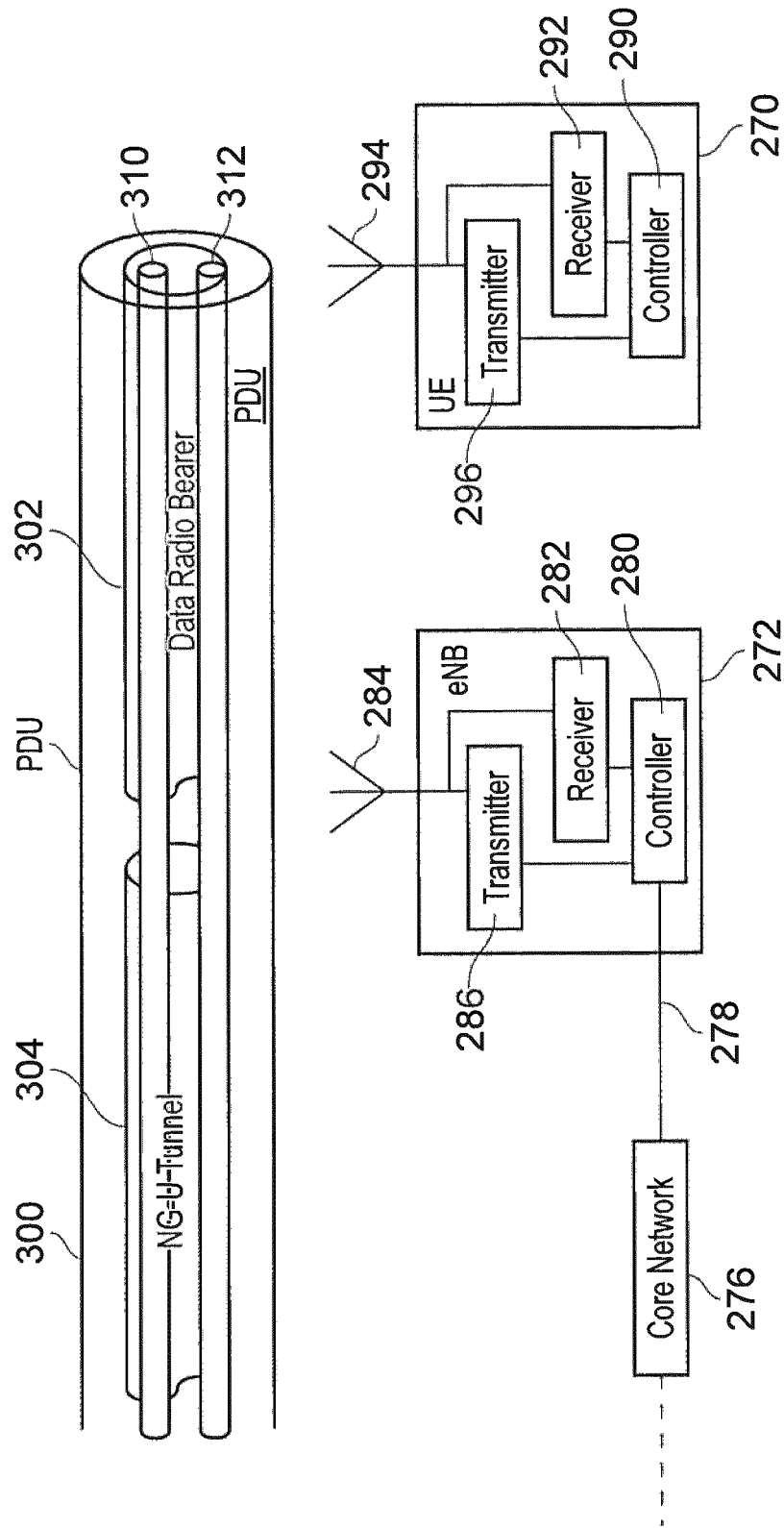
FIG. 3 is a schematic block diagram of an example infrastructure equipment and communications device configured in accordance with example embodiments which form a packet data bearer for communicating data.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 has established a packet data bearer 300 to transmit uplink data to the infrastructure equipment 272 or receive data transmitted by the infrastructure equipment 272. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

As mentioned above, embodiments of the present technique can provide an enhanced relative priority indicator in order to improve an allocation of communications resources to satisfy new services such as URLLC. As shown in FIG. 3 the controller of the UE 270 operates in combination with the wireless communications network to establish the packet data bearer 300. The packet data bearer 300 is comprised of a data radio bearer 302 and a next generation-user data (NG-U) tunnel 304. As those acquainted with 3GPP standards will appreciate, a data radio bearer 302 is established using a radio resource connection protocol to communicate data for a session via a wireless access interface provided by a wireless communications network. To this end, the transmitter 286, and receiver 282 are configured in combination with the receiver 292 and the transmitter 296 of the UE 270 to form the radio access bearer using a radio resource connection protocol. Correspondingly to communicate the data packets via the core network 276, a NG-U tunnel is configured for communicating the data packets via the interface 278 from the infrastructure equipment 272 via the core network 276 to a destination node. The interface 278 is therefore configured in accordance with a new generation user plane data interface NG-U and accordingly an NG-U tunnel 304 is established for communicating the data to form the packet data bearer 300.

As shown within the packet data bearer 300, as two solidly shaded pipes 310, 312 two QoS flows are provided for the communication of data in accordance with different communications parameters. As will be appreciated by those who are familiar with 5G, different QoS flows are provided within the packet data bearer to communicate data in accordance with different communications parameters such as those indicated by for example 5QI mentioned above. However embodiments of the present technique can provide an arrangement for extending a definition and specification of QoS for prioritisation of transmitting data via the radio bearer 302.

Figure 4:
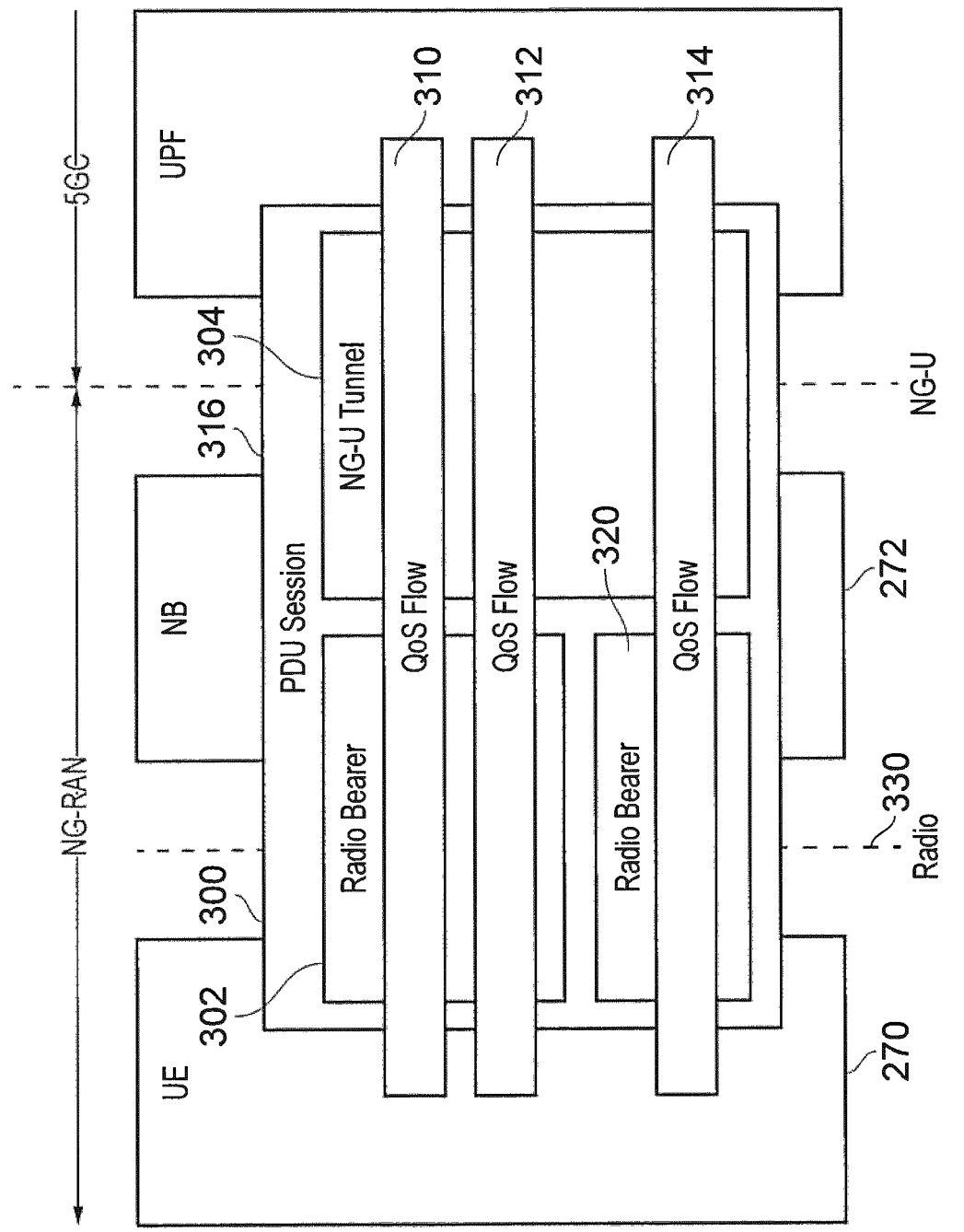
FIG. 4 provides an illustrative representation of interfaces and bearer types of the arrangement shown in FIG. 3.

A representation of the interfaces required to form the packet data bearer 300 between the infrastructure equipment 272, the UE 270 and the core network 276 according to FIG. 3 is shown in FIG. 4.

Figure 5:
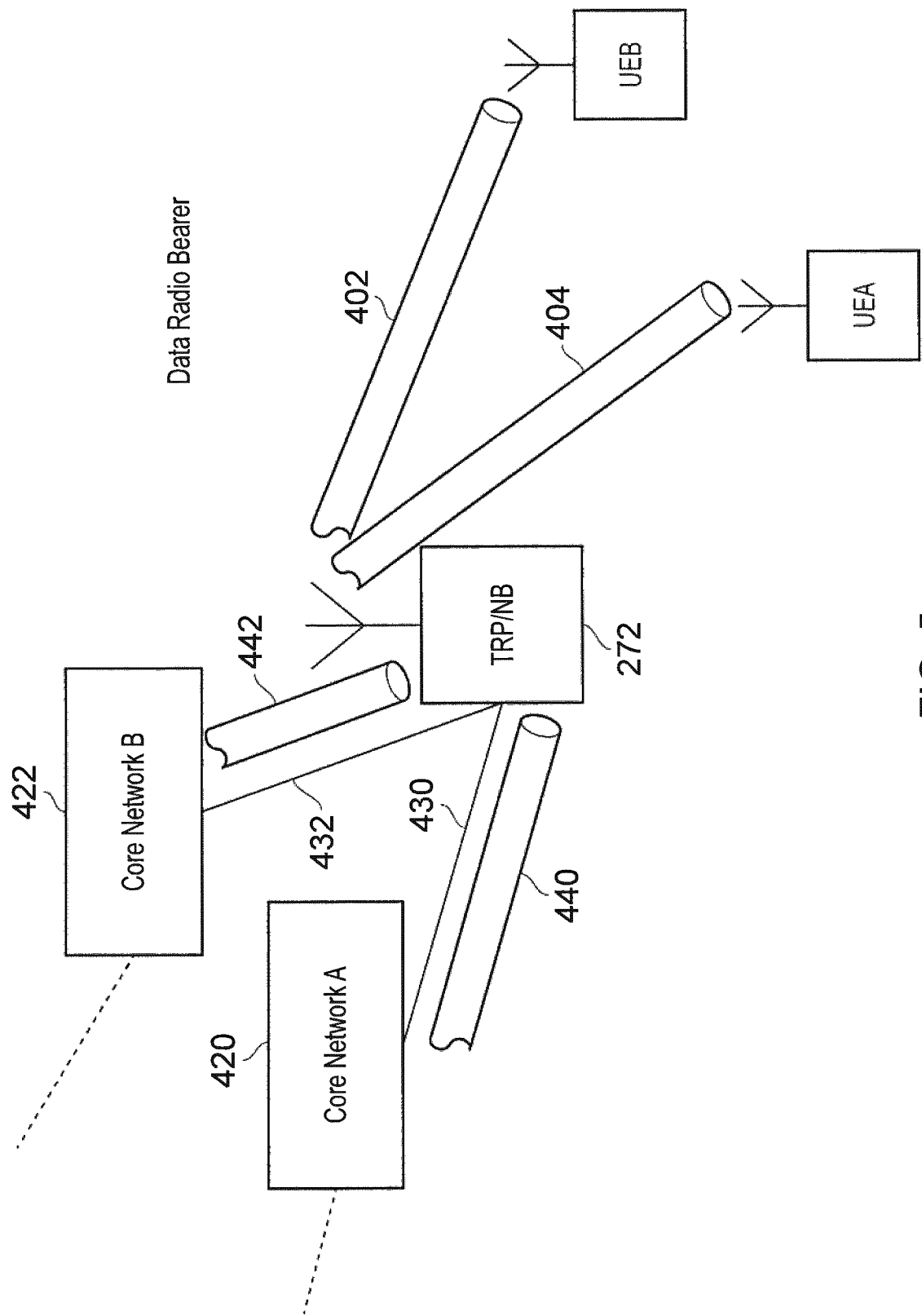
FIG. 5 is a schematic block diagram of an arrangement in which different network operators share the same infrastructure equipment forming a radio access network which provides different radio bearers to different communications devices but which communicate via different core networks in accordance with embodiments of the present technique.

As shown in FIG. 4, the packet data bearer 300 is formed by a PDU session 316 which includes the formation of the radio bearer 302 as well as other radio bearers 320. The packet data bearer 300 forms a plurality of QoS flows 310, 312, 314 which may be formed by one or more radio bearers 302, 320. After being transmitted or received via the wireless access interface 330 the packet data is transmitted via the NG-U tunnel 304 according to each of the different QoS flows 310, 312, 314. As will be appreciated the infrastructure equipment (eNodeB or TRP, control node) 272 may be configured to provide radio bearers to each a plurality of user equipment as shown in FIG. 5. As shown in FIG. 5 the infrastructure equipment (TRP/NB) 272 provides the plurality of radio bearers 402, 404 to different user equipment UEA, UEB via the wireless access interface provided by the infrastructure equipment 272. However as shown in FIG. 5 and in accordance with some embodiments of the present technique the infrastructure equipment 272 forming part of the radio access network may be shared by different operators connecting their different core networks. As shown in FIG. 5 the infrastructure equipment 272 is connected to different core networks 420 and 422 via different NG-U interfaces 430, 432. Accordingly different NG-U tunnels 440, 442 are provided to communicate the data packets from the infrastructure equipment via the different core networks 420, 422.

In one application, embodiments of the present technique can provide an arrangement allowing an infrastructure equipment forming part of a radio access network to be shared by different network operators whilst allowing data to be communicated with a priority given to one of the network operators over the other.

Embodiments of the present technique can provide an improved relative priority indicator included as part of communications parameters defining a QoS flow so that a further communications attribute can be added to differentiate a way that the data is transmitted by an infrastructure equipment to a data communications apparatus. In one example the transmission of the data is prioritised in respect of a service type for example URLLC is prioritised over eMBB. In another example the data communicated from one mobile operator is prioritised over another. Prioritisation is achieved by adapting or enhancing an allocated and retention priority indicator (ARP) which is provided to each radio bearer or a QoS flow within a radio bearer to prioritise data transmitted to communications devices via a radio access interface. According to example embodiments therefore the priority level is enhanced by providing information for a further communications attribute. This may be achieved by adding an additional information element to the ARP indicator. This is because current standardised indications for the ARP values as indicated above are limited to fifteen, providing fifteen examples for communications devices in their home network. Correspondingly for different service types a 5QI information element is set by the core network and an old field is used by other services such as eMBB and a new information element is used for newly added services like URLLC. According to this arrangement backward compatibility is provided for existing networks.

According to example embodiments of the present technique an ARP value (relative priority indicator) is adapted to take into account a prioritisation between different service types for example URLLC based on different URLLC services, a differentiation between the URLLC and other low priority services such as UMBB and differentiation based on the different operators.

The QoS parameter, ARP, can contain information about a priority level, a pre-emption capability and a pre-emption vulnerability. The priority level defines the relative importance of a resource request that is a request to establish a radio bearer of a QoS flow. According to this prioritisation a new QoS flow may be accepted or may be rejected or have resources limited based on the priority level indicated. This may also indicate which existing QoS flows should be pre-empted during resource flow limitations. Currently a range of ARP priority levels is 1 to 15. The ARP priority level 1 to 8 are assigned to resources for services that are authorised to receive prioritised treatment with an operator domain whereas ARP levels 9 to 15 may be assigned to resources that are authorised by the home network and thus applicable when a UE is roaming.

Figure 6:
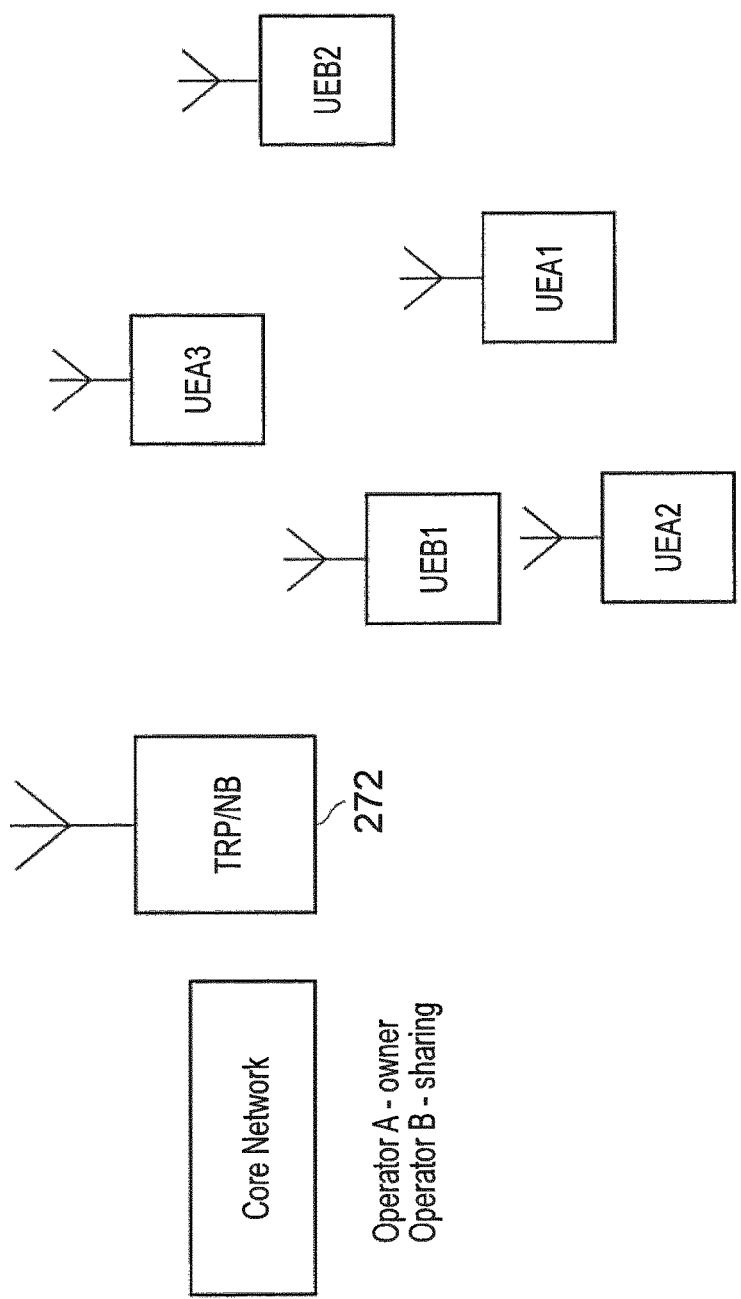
FIG. 6 is a schematic block diagram illustrating the operation of an infrastructure equipment which performs a prioritisation of transmission of data via different workflows in accordance with an extended priority level.

FIG. 6 provides an example illustration in which the operators A and B shown in FIG. 5 are sharing the same core network and same radio access network. As shown as a representation in a table 500 a controller in the infrastructure equipment 272 is configured to prioritise communications to five different UEs, UEA1, UEA2, UEA3, UEB1, UEB2 to provide a different priority value which is shown in FIG. 6 as including a priority level 1 to 4. Accordingly as shown in column 501 each of the UEs is identified and in column 2 each of the services provided to each of the UEs. In column 3 503 a priority level is provided to each of the services for each of the UEs and column 4 504 identifies the relative priority.

For the example embodiment shown in FIG. 6 eMBB traffic from both operators has the lowest priority. However, URLLC service Y from operator A has a higher priority than the same URLLC service from operator B. Furthermore as shown in the example in FIG. 6, each of two operators share the core network. That is to say that FIG. 5 shows two core networks while FIG. 6 shows a single core network shared by both the operators A and B. FIG. 6 shows operator A as the owner and B as sharing operator A's core network 500, while FIG. 5 shows operator A core network as 420 and operator B core network as 422. Therefore the same infrastructure equipment 272 has to provide the further communications attribute in addition to the convention ARP indications, which would therefore require 15×n indications where n is the number of values of the communications attribute. For example, if number of operators sharing the network increases to 12, then there would be required 15×12=180 different values, which are currently not available.

As will be appreciated from the above description, according to example embodiments, an ARP which is currently applicable to a QoS flow is extended to be applicable to different operators taking into account a user's subscription. If a user's subscription is taken into account in the core network then one solution according to the present technique is to extend the ARP range to allow a QoS flow to be prioritized or allow data from other QoS flows to be transmitted before or in place of data from a QoS flow with a lower priority. If a user's subscription is taken into account in the radio access network, then other parameters like, for example, a selected public land mobile network (PLMN) or a selected radio access technology (RAT) frequency selection priority ID (RFSP) may be used too, in order to indicate the relative priority of the QoS flows. A combination of both is also possible.

As will be appreciated therefore, a new "Priority Level" information element can be provided with an ARP information element. This may have the same value range as an existing "Priority Level" information element. For URLLC traffic 5QI, a new information element is set by the core network and an old field is used for eMBB or old services. This approach can provide for backward compatibility.

In another embodiment, ARP information elements are introduced for each operator sharing the infrastructure equipment. Then either, the operator preference is indicated or operators chose unique values. There is currently a parameter called "RFSP" (Inter RAT/Frequency Selection Priority) used for RRM purposes only and it takes a UE's subscription into account. So, in one embodiment, the scope of the RFSP parameter is extended and used along with ARP attributes and RFSP index is used while deciding preemption for a QoS flow belonging to a UE. This approach may work with or without extending the priority values.

According to another aspect of example embodiments, a user's subscription can be taken into account in the core network if a core network is shared. If separate core networks are deployed then, as indicated above, subscription information can be taken into account in the radio access network (RAN). As will be appreciated therefore, there are two aspects, firstly there is a configuration of ARP values, in which a user's subscription information is taken into account while configuring ARP values for a particular QoS flow for a UE. Secondly there are aspects of embodiments relating to the use of these configured ARP values. Furthermore as represented in the example embodiments represented in FIGS. 5 and 6, there are two options for which the prioritisation based on a user's subscription and on a core network awareness and a radio access network awareness. Based on this awareness one or both of the core network and the radio access network can differentiate in respect of the priority given to different quality of service flows, but on a user's subscription in addition to an ARP value.

Thus, according to some embodiments, the infrastructure equipment 272 may determine a priority level for use in respect of a radio bearer or QoS flow by receiving an indication of a bearer priority level, such as an ARP value, which is associated with the radio bearer or QoS flow. The indication may be received from a core network, such as the core networks 420, 422 of FIG. 5.

In one example, the infrastructure equipment may release UEs belonging to another operator first even if they have the same priority. This can be done by using gNB awareness of UE "selected PLMN" which is included in message 5 of a random access procedure. So, selected PLMN value, in addition to ARP attributes, is used by the network to decide if UE shall be released or not.

Embodiments according to a certain aspect can therefore provide an infrastructure equipment which is configured to form part of a radio network of a wireless communications network. The infrastructure equipment is configured to operate a plurality of packet data bearers for communicating data to or from communications devices via a wireless access interface to provide wireless connectivity to the communications devices. Each of the plurality of packet data bearers includes one or more radio bearers, each of the radio bearers including one or more quality of service flows defined by parameters for communicating the data. The infrastructure equipment operates to determine an operator priority level associated with each of the packet data bearers between a plurality of network operators, the communications devices each being a subscriber of one of the plurality of network operators for the wireless connectivity. The infrastructure equipment controls the plurality of packet data bearers to prioritise communicating the data to or from the communications devices according to a relative priority determined from the operator priority level.

In another embodiment, a priority level of each PLMN is included in a signalling exchange between the gNB and the core network. This may be done at many stages for example at the time of gNB setup. For example, the priority indication may be more static and may be established by messages exchanged between gNBs during X2 or S1 interface setup, which does not involve UE/QoS flow/PDU session specific signalling. The priority indication may be agreed between network operators and may be held in a data base attached to the wireless communications network. This priority is used in addition to ARP priority, which may be used as conventionally to prioritise data for a particular QoS flow.

According to some embodiments, in addition or alternatively to determining a priority level based on a bearer priority level, the infrastructure equipment 272 may determine a priority level for use in respect of a radio bearer or QoS flow based on a mobile communications network associated with the UE with which the radio bearer or QoS flow is to be, or has been, established.

For example, as described above, each UE may be a subscriber of a mobile communications network, such as the mobile communications network of operator A, whose mobile communications network includes the core network A 420 of FIG. 5.

The infrastructure equipment 272 may determine an operator priority level, associated with one or more mobile communications networks, such as the mobile communications networks operated by operator A and operator B.

For example, operator A may be associated with a priority which is higher than that associated with operator B. If a UE, such as the UE A of FIG. 5, requests the establishment of a radio bearer, then the infrastructure equipment establishes and/or operates that radio bearer in accordance with the operator priority associated with operator A. In particular, the infrastructure equipment may give priority in the establishment and/or operation of a radio bearer for UE A in preference to the establishment and/or operation of a radio bearer for UE B, UE B being associated with (such as a subscriber of) operator B.

According to some embodiments, the infrastructure equipment 272 may determine a priority level for use in respect of a radio bearer or QoS flow based on both a bearer priority level associated with the radio bearer or QoS flow and an operator priority level associated with a mobile communications network associated with the UE.

In some embodiments, the operator priority level may take precedence, such that a bearer for a UE associated with an operator whose respective priority is high may be given precedence over a bearer for a UE associated with an operator whose respective priority is lower, and irrespective of any bearer priority levels associated with either bearer.

In some embodiments, the operator priority level may be combined with a bearer priority level to give a combined priority level in accordance with pre-determined configuration or rules. In some such embodiments, therefore, a bearer for a first UE associated with an operator whose respective priority is high may have a lower combined priority level than a bearer for a second UE associated with an operator whose respective priority is lower, if the bearer priority of the bearer for the second UE is sufficiently higher than that of the bearer for the first UE.

In some embodiments, the operator priority level and bearer priority level may be used depending on the service associated with a radio bearer or QoS flow. For example, all bearers and QoS flows associated with the URLLC service may be established and operated without regards to the operator priority. On the other hand, eMBB service flows may be prioritised based on the operator priority.

The infrastructure equipment 272 may determine an operator priority level by receiving an indication from one or more of the core networks, by manual configuration (e.g. by a representative of one of the operators), or based on default rules (e.g. an mobile network for which has no operator priority level associated with it is treated in accordance with a default priority level).

An operator priority level associated with each PLMN may be included in a signalling exchange between the gNB and the core network. This may be done at many stages for example at the time of gNB setup or UE specific bearer setup. For example, the operator priority indication may be static and may be determined based on messages exchanged between gNBs during X2 or S1 interface setup. Determination of operator priority levels may be independent of (i.e. not forming part of) UE/QoS flow/PDU session specific signalling. The operator priority levels may be agreed between network operators and/or may be held in, and retrieved from, a database attached to the wireless communications network.

In some embodiments, such as shown in FIG. 6, a core network may be shared between multiple operators. In some such embodiments, the infrastructure equipment 272 may receive, from the shared core network, an indication of the operator priority levels associated with each of the operators sharing the core network.

According to the above explanation therefore, example embodiments can provide an arrangement in which transmission of data via different QoS flows is prioritised based on either the service type or operator. For example different priorities can be given to pre-emption capability and vulnerability. According to example embodiments ARP values can take into account the prioritization as follows:

As a result of URLLC, multiple QoS flows may be present for different URLLC services and require differentiation between these flows (between URLLC flows) and Differentiation between URLLC and other low priority flows e.g. between eMBB/VoIP and URLLC Users belonging to different operators are prioritised differently.

In a typical implementation, an assigned priority level value of a QoS flow may be assigned to the associated data radio bearer (DRB) and a Logical Channel Priority (LCP) value. The LCP is a priority indication for logical channel to allow a bit rate to be prioritised in accordance with a Prioritised Bit Rate (PBR) with respect to other logical channels, which provides a different technique for prioritising an allocation of communications resources. The LCP is indicated as part of an RRC signalling for uplink priority handling rules within the UE. So, if a priority level value range is extended then in some examples the LCP values are also extended. This will require changes to radio resource control RRC signalling and an LCP procedure to handle increased values. In one example an ARP Priority Level information element can be mapped to logical channel priority value which is signalled to the UE for uplink priority handling. For down-link, the range of logical channel priority, which is signalled to the UE, is also increased to differentiate between URLLC services or between URLLC and other services for UL scheduling.

In the above embodiments, the shared gNB can be a moving gNB. The function of the shared gNB can be implemented in a UE, i.e. the UE can operate as gNB for the RAN sharing. As those skilled in the art will appreciate, a UE can act as an infrastructure equipment and may be shared therefore between different network operators.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating an infrastructure equipment forming part of a wireless communications network, the method comprising establishing a packet data bearer for transmitting data to a communications device via a wireless access interface, establishing the packet data bearer including establishing a radio bearer in accordance with a radio resource connection procedure for transmitting the data via the wireless access interface to the communications device, the radio bearer including one or more quality of service flows, each of the quality of service flows being associated with a communications service provided to the communications device and each of the quality of service flows defined by parameters for communicating the data for the communications service, the parameters including a relative priority indicator providing an indication of a priority for transmitting the data with respect to other quality of service flows, and transmitting the data to the communications device via the radio bearer for the one or more quality of service flows, wherein transmitting the data via the radio bearer for the one or more quality of service flows includes prioritising transmitting the data for one of the one or more quality of service flows with respect to at least one other of the quality of service flows or one or more other quality of service flows for one or more other radio bearers with one or more other communications devices according to the relative priority indicator for the quality of service flow, the relative priority indicator for each of the quality of service flows including an indication of a priority level for the data, which includes a priority according to at least one other communications attribute.

Paragraph 2. The method of paragraph 1, wherein the at least one other communications attribute includes an indication of a type of the communications service provided to the communications device, and the transmitting the data via each of the one or more quality of service flows comprises transmitting the data according to a relative priority determined from the priority level for the data and the type of service being provided to the communications device.

Paragraph 3. The method of paragraph 1 or paragraph 2, wherein the at least one other communications attribute includes an indication of one of a plurality of network operators associated with the communications device, and the transmitting the data via each of the one or more quality of service flows comprises transmitting the data according to a relative priority determined from the priority level for the data and the indication of the network operator associated with the communications device.

Paragraph 4. The method of paragraph 3, wherein the wireless communications network comprises a core network connected to a radio network of which the infrastructure network forms part, the core network and the radio network being shared between a plurality of operators, and the indication of the network operator associated with the communications device identifies one of the network operators sharing the core network.

Paragraph 5. The method of paragraph 3, wherein the wireless communications network includes a plurality of core networks connected to a radio network of which the infrastructure network forms part, the radio network being shared between a plurality of operators of the core networks, and the indication of the network operator associated with the communications device identifies one of the core networks of the operator associated with the communications device.

Paragraph 6. The method of paragraph 4 or paragraph 5, comprising establishing, with the wireless access interface, a packet data bearer for transmitting data to a wireless communications network via a wireless access interface, establishing the packet data bearer including establishing the radio bearer in accordance with the radio resource connection procedure, wherein the transmitting the data via each of the one or more quality of service flows comprises transmitting the data via the radio bearer according to a relative priority determined from the priority level for the data and the indication of the network operator associated with the communications device and the packet data bearer via the core network.

Paragraph 7. The method of any of paragraphs 1 to 6, wherein the at least one other communications attribute includes an indication of one of a plurality of inter radio access technology or frequency selection priority, and the transmitting the data via each of the one or more quality of service flows comprises transmitting the data according to a relative priority determined from the priority level for the data and the indication of the inter radio access technology or the frequency selection priority.

Paragraph 8. The method of any of paragraphs 1 to 7, wherein the transmitting the data via each of the one or more quality of service flows comprises pre-empting the transmission of the data via at least one of the other service flows to the communications device on communications resources of the wireless access interface instead of transmitting data of the one or more other quality of service flows for the radio bearer established for the communications device or the one or more other radio bearers with one or more other communications devices according to the relative priority indicator for the quality of service flow.

Paragraph 9. The method of any of paragraphs 1 to 8, wherein the transmitting the data via each of the one or more quality of service flows comprises prioritising the radio bearer providing at least one of the other service flows to the communications device established for the communications device over the one or more other radio bearers with one or more other communications devices according to the relative priority indicator.

Paragraph 10. The method of any of paragraphs 2 to 9, wherein the type of service includes a Ultra Reliable and Low Latency, URLLC, service type and the relative priority indicator provides a higher relative priority for transmitting URLLC data.

Paragraph 11. The method of any of paragraphs 2 to 9, wherein the type of service includes an enhanced Mobile Broadband, eMBB, service type and the relative priority indicator provides a lower relative priority for transmitting eMBB data.

Paragraph 12. The method of any of paragraphs 1 to 11, wherein the at least one other communications attribute is indicated as part of the relative priority indicator, by extending a relative priority indicator to include additional fields or an increased range of values.

Paragraph 13. The method of paragraph 11, wherein the relative priority indicator is an allocation and retention priority, ARP, indicator.

Paragraph 14. A method of operating an infrastructure equipment forming part of a radio network of a wireless communications network, the method comprising operating a plurality of packet data bearers for communicating data to or from communications devices via a wireless access interface to provide wireless connectivity to the communications devices, each of the plurality of packet data bearers including one or more radio bearers, each of the radio bearers including one or more quality of service flows defined by parameters for communicating the data, determining an operator priority level associated with each of the packet data bearers between a plurality of network operators, the communications devices each being a subscriber of one of the plurality of network operators for the wireless connectivity, and controlling the plurality of packet data bearers to prioritise communicating the data to or from the communications devices according to a relative priority according to the operator priority level.

Paragraph 15. The method of paragraph 14, wherein the controlling the plurality of packet data bearers to prioritise communicating the data to or from the communications devices according to a relative priority according to the operator priority level includes prioritising an allocation of communications resources a first of the packet data bearers with a higher operator priority level before another of the packet data bearers with a lower operator priority level.

Paragraph 16. The method of paragraph 14, wherein the controlling the plurality of packet data bearers to prioritise communicating the data to or from the communications devices according to a relative priority according to the operator priority level includes releasing one of the packet data bearers with a lower operator priority level and retaining another of the packet data bearers with a higher operator priority level.

Paragraph 17. The method of paragraph 15 or paragraph 16, comprising communicating the data to the communications devices or receiving data from the communications devices for each of the plurality of packet data bearers via the radio bearer for the one or more quality of service flows by prioritising the data for one of the one or more quality of service flows with respect to at least one other of the quality of service flows according to a relative priority indicator for the quality of service flow.

Paragraph 18. The method of any of paragraphs 14 to 17, wherein the determining the operator priority level associated with each of the packet data bearers between the plurality of network operators, includes receiving the operator priority level for each of the plurality of network operators from an infrastructure equipment forming part of the wireless communications network.

Paragraph 19. The method of any of paragraphs 14 to 18, wherein the infrastructure equipment forms part of a radio access network shared between the plurality of network operators.

Paragraph 20. The method of paragraph 19, wherein the wireless communications network includes a core network part shared between the plurality of network operators.

Paragraph 21. The method of paragraph 19, wherein the wireless communications network includes a plurality of core networks, each of the core networks being operated by one of the plurality of network operators.

Paragraph 22. An infrastructure equipment forming part of a wireless communications network, the infrastructure equipment comprising a transceiver configured to transmit signals to communications devices via a wireless access interface and receive signals from the communications device transmitted via the wireless access interface, and a controller configured to control the transceiver to establish a packet data bearer for transmitting data to one of the communications devices via the wireless access interface, to establish, as part of establishing the packet data bearer, a radio bearer in accordance with a radio resource connection procedure for transmitting the data via the wireless access interface to the communications device, the radio bearer including one or more quality of service flows, each of the quality of service flows being associated with a communications service provided to the communications device and each of the quality of service flows defined by parameters for communicating the data for the communications service, the parameters including a relative priority indicator providing an indication of a priority for transmitting the data with respect to other quality of service flows, and to transmit the data to the communications device via the radio bearer for the one or more quality of service flows, wherein the data is transmitted via the radio bearer for the one or more quality of service flows by prioritising the transmitting of the data for one of the one or more quality of service flows with respect to at least one other of the quality of service flows or one or more other quality of service flows for one or more other radio bearers with one or more other communications devices according to the relative priority indicator for the quality of service flow, the relative priority indicator for each of the quality of service flows including an indication of a priority level for the data, which includes a priority according to at least one other communications attribute.

Paragraph 23. An infrastructure equipment forming part of a wireless communications network, the infrastructure equipment comprising a transceiver configured to transmit signals to communications devices via a wireless access interface and receive signals from the communications device transmitted via the wireless access interface to provide wireless connectivity to the communications devices, and a controller configured to control the transceiver to operate a plurality of packet data bearers for communicating data to or from the communications devices via the wireless access interface, each of the plurality of packet data bearers including one or more radio bearers, each of the radio bearers including one or more quality of service flows defined by parameters for communicating the data, to determine an operator priority level associated with each of the packet data bearers between a plurality of network operators, the communications devices each being a subscriber of one of the plurality of network operators for the wireless connectivity, and to control the plurality of packet data bearers to prioritise communicating the data to or from the communications devices according to a relative priority according to the operator priority level.

Paragraph 24. Circuitry for an infrastructure equipment forming part of a wireless communications network, the circuitry comprising transceiver circuitry configured to transmit signals to communications devices via a wireless access interface and receive signals from the communications device transmitted via the wireless access interface, and controller circuitry configured to control the transceiver circuitry to establish a packet data bearer for transmitting data to one of the communications devices via the wireless access interface, to establish, as part of establishing the packet data bearer, a radio bearer in accordance with a radio resource connection procedure for transmitting the data via the wireless access interface to the communications device, the radio bearer including one or more quality of service flows, each of the quality of service flows being associated with a communications device and each of the quality of service flows defined by parameters for communicating the data for the communications service, the parameters including a relative priority indicator providing an indication of a priority for transmitting the data with respect to other quality of service flows, and to transmit the data to the communications device via the radio bearer for the one or more quality of service flows, wherein the data is transmitted via the radio bearer for the one or more quality of service flows by prioritising the transmitting of the data for one of the one or more quality of service flows with respect to at least one other of the quality of service flows or one or more other quality of service flows for one or more other radio bearers with one or more other communications devices according to the relative priority indicator for the quality of service flow, the relative priority indicator for each of the quality of service flows including an indication of a priority level for the data, which includes a priority according to at least one other communications attribute.

Paragraph 25. Circuitry for an infrastructure equipment forming part of a wireless communications network, the circuitry comprising transceiver circuitry configured to transmit signals to communications devices via a wireless access interface and receive signals from the communications device transmitted via the wireless access interface to provide wireless connectivity to the communications devices, and controller circuitry configured to control the transceiver circuitry to operate a plurality of packet data bearers for communicating data to or from the communications devices via the wireless access interface, each of the plurality of packet data bearers including one or more radio bearers, each of the radio bearers including one or more quality of service flows defined by parameters for communicating the data, to determine an operator priority level associated with each of the packet data bearers between a plurality of network operators, the communications devices each being a subscriber of one of the plurality of network operators for the wireless connectivity, and to control the plurality of packet data bearers to prioritise communicating the data to or from the communications devices according to a relative priority according to the operator priority level.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Work Item on New Radio (NR) Access Technology," NTT DOCOMO, RAN#78
[3] RP-181477, "New SID on Physical Layer Enhancements for NR URLLC," Huawei, HiSilicon, Nokia, Nokia Shanghai Bell, RAN#80.
[4] R1-1809979, Summary of 7.2.6.3 Enhanced UL grant-free transmissions, NTT DOCOMO, RAN1#94.

What is claimed is:

1. A method of operating an infrastructure equipment forming part of a wireless communications network, the method comprising
establishing a packet data bearer for transmitting data to a communications device via a wireless access interface,
establishing the packet data bearer including establishing a radio bearer in accordance with a radio resource connection procedure for transmitting the data via the wireless access interface to the communications device, the radio bearer including one or more quality of service flows, each of the quality of service flows being associated with a communications service provided to the communications device and each of the quality of service flows defined by parameters for communicating the data for the communications service, the parameters including a relative priority indicator providing an indication of a priority for transmitting the data with respect to other quality of service flows, and
transmitting the data to the communications device via the radio bearer for the one or more quality of service flows,
wherein transmitting the data via the radio bearer for the one or more quality of service flows includes prioritising transmitting the data for one of the one or more quality of service flows with respect to at least one other of the quality of service flows or one or more other quality of service flows for one or more other radio bearers with one or more other communications devices according to the relative priority indicator for the quality of service flow, the relative priority indicator for each of the quality of service flows including an indication of a priority level for the data, which includes a priority according to at least one other communications attribute,
wherein the at least one other communications attribute includes an indication of a type of the communications service provided to the communications device, and the transmitting the data via each of the one or more quality of service flows comprises transmitting the data according to a relative priority determined from the priority level for the data and the type of service being provided to the communications device.

2. The method of claim 1, wherein the type of service includes a Ultra Reliable and Low Latency, URLLC, service type and the relative priority indicator provides a higher relative priority for transmitting URLLC data.

3. The method of claim 1, wherein the type of service includes an enhanced Mobile Broadband, eMBB, service type and the relative priority indicator provides a lower relative priority for transmitting eMBB data.

4. The method of claim 3, wherein the relative priority indicator is an allocation and retention priority, ARP, indicator.

5. The method of claim 1, wherein the at least one other communications attribute includes an indication of one of a plurality of network operators associated with the communications device, and the transmitting the data via each of the one or more quality of service flows comprises transmitting the data according to a relative priority determined from the priority level for the data and the indication of the network operator associated with the communications device.

6. The method of claim 5, wherein the wireless communications network comprises a core network connected to a radio network of which the infrastructure network forms part, the core network and the radio network being shared between a plurality of operators, and the indication of the network operator associated with the communications device identifies one of the network operators sharing the core network.

7. The method of claim 6, comprising establishing, with the wireless access interface, a packet data bearer for transmitting data to a wireless communications network via a wireless access interface, establishing the packet data bearer including establishing the radio bearer in accordance with the radio resource connection procedure, wherein the transmitting the data via each of the one or more quality of service flows comprises transmitting the data via the radio bearer according to a relative priority determined from the priority level for the data and the indication of the network operator associated with the communications device and the packet data bearer via the core network.

8. The method of claim 5, wherein the wireless communications network includes a plurality of core networks connected to a radio network of which the infrastructure network forms part, the radio network being shared between a plurality of operators of the core networks, and the indication of the network operator associated with the communications device identifies one of the core networks of the operator associated with the communications device.

9. The method of claim 1, wherein the at least one other communications attribute includes an indication of one of a plurality of inter radio access technology or frequency selection priority, and the transmitting the data via each of the one or more quality of service flows comprises transmitting the data according to a relative priority determined from the priority level for the data and the indication of the inter radio access technology or the frequency selection priority.

10. The method of claim 9, wherein the transmitting the data via each of the one or more quality of service flows comprises
pre-empting the transmission of the data via at least one of the other service flows to the communications device on communications resources of the wireless access interface instead of transmitting data of the one or more other quality of service flows for the radio bearer established for the communications device or the one or more other radio bearers with one or more other communications devices according to the relative priority indicator for the quality of service flow.

11. The method of claim 10, wherein the transmitting the data via each of the one or more quality of service flows comprises
prioritising the radio bearer providing at least one of the other service flows to the communications device established for the communications device over the one or more other radio bearers with one or more other communications devices according to the relative priority indicator.

12. The method of claim 1, wherein the at least one other communications attribute is indicated as part of the relative priority indicator, by extending a relative priority indicator to include additional fields or an increased range of values.

\* \* \* \* \*